United States Patent
Musacchi et al.

(10) Patent No.: US 9,284,475 B2
(45) Date of Patent: Mar. 15, 2016

(54) PRESSURE SENSITIVE ADHESIVE WITH BUTENE-1 COPOLYMERS

(75) Inventors: Gianluca Musacchi, Ferrara (IT); Inge Elisabeth Roucourt, Huldenberg (BE); Giampaolo Pellegatti, Ferrara (IT); Johan De Clippeleir, Oud Heverlee (BE); Stefano Spataro, Ferrara (IT)

(73) Assignee: Basell Poliolefine Italia S.r.l., Milano (IT)

( * ) Notice: Subject to any disclaimer, the term of this patent is extended or adjusted under 35 U.S.C. 154(b) by 126 days.

(21) Appl. No.: 13/880,403

(22) PCT Filed: Oct. 18, 2011

(86) PCT No.: PCT/EP2011/068177
§ 371 (c)(1),
(2), (4) Date: Apr. 19, 2013

(87) PCT Pub. No.: WO2012/052429
PCT Pub. Date: Apr. 26, 2012

(65) Prior Publication Data
US 2013/0202836 A1    Aug. 8, 2013

Related U.S. Application Data

(60) Provisional application No. 61/405,672, filed on Oct. 22, 2010.

(30) Foreign Application Priority Data

Oct. 21, 2010 (EP) .................................. 10188301

(51) Int. Cl.
| | | |
|---|---|---|
| B32B 7/12 | (2006.01) | |
| B32B 15/04 | (2006.01) | |
| C09J 123/20 | (2006.01) | |
| C09J 7/02 | (2006.01) | |
| C08L 57/02 | (2006.01) | |

(52) U.S. Cl.
CPC .............. *C09J 123/20* (2013.01); *C09J 7/0207* (2013.01); *C08L 57/02* (2013.01); *Y10T 428/1452* (2015.01)

(58) Field of Classification Search
CPC ............................... C09J 123/20; C09J 7/0207
USPC .............................................. 428/343, 355 R
See application file for complete search history.

(56) References Cited

U.S. PATENT DOCUMENTS

| | | |
|---|---|---|
| 4,568,713 A | 2/1986 | Hansen et al. |
| 4,937,138 A | 6/1990 | Mostert |
| 7,622,176 B2 | 11/2009 | Bardiot et al. |
| 2004/0077759 A1 | 4/2004 | Bardiot et al. |
| 2005/0245710 A1 | 11/2005 | Kanamaru et al. |
| 2006/0029796 A1 | 2/2006 | Ukei et al. |

FOREIGN PATENT DOCUMENTS

| | | |
|---|---|---|
| CN | 1491267 A | 4/2004 |
| DE | 102008026670 A1 * | 12/2009 |
| JP | 2006045426 A | 2/2006 |
| JP | 2009241477 A | 10/2009 |
| WO | WO2009147104 | 12/2009 |

OTHER PUBLICATIONS

Translation of DE102008026670. See above for date and inventor.*
Crystallization Kinetics and Polymorphic Transformations in Polybutene-1, Powers, et al., 1965.*
PCT International Search Report & Written Opinion mailed Jan. 2, 2012, for PCT/EP2011/068177.

* cited by examiner

Primary Examiner — Victor Chang

(57) ABSTRACT

Pressure sensitive adhesive composition and multilayer easy peel re-closable structures thereof, comprising a butene-1 (co)polymer (A) having a content of butene-1 derived units of 80 wt % or more; a flexural modulus (MEF) of 80 MPa or less; a melting temperature DSC (TmI) lower than 110° C., and optionally a tackifier (B).

7 Claims, No Drawings

PRESSURE SENSITIVE ADHESIVE WITH BUTENE-1 COPOLYMERS

This application is the U.S. National Phase of PCT International Application PCT/EP2011/068177, filed Oct. 18, 2011, claiming priority of European Patent Application No. 10188301.5, filed Oct. 21, 2010 and the benefit under 35 U.S.C. 119(e) of U.S. Provisional Application No. 61/405, 672 filed Oct. 22, 2010, contents of which are incorporated herein by reference in their entirety.

The present invention relates to a pressure sensitive adhesive composition comprising butene-1 (co)polymers (homo or copolymers) and multilayer easy peel re-closable structures with butene-1 (co)polymers in the reclosable pressure sensitive adhesive layer.

Flexible packages easy to peel and reclosable are known in the art. For example, mechanical strips, such as interlocking fasteners or zippers, and adhesive strips positioned on an exterior film surface or within the film structure.

The present invention relates to multilayer easy peel re-closable structures providing a heat seal peelable and reclosable between substrates, such as a rigid container and a peelable lid, or a flexible film package made from films and/or laminates. In such structures it is desirable to have an adequate, nearly constant peel strength when used on rigid containers including styrenic containers and polyvinyl chloride (PVC) or PET containers or polyolefin containers. The present invention is preferably directed to rigid containers or flexible film packages requiring sealability on polyolefin polymers, preferably propylene or polyethylene polymers substrates. The seals can be formed over a wide range of heat seal temperatures and are easily peelable. The seal strength must be adequate to maintain the package in a closed and protective condition, while also exhibiting such release properties as will permit opening by peeling when desired. The term reclosable refer to the ability of the substrate and lid or of the laminates in the film package to be re-closed after the first peeling providing again a seal strength adequate to maintain the package in a closed and protective condition till a second and further opening. The term peelable refers to a seal failure which occurs primarily at the interface of the sealing surfaces, rather than by film tearing.

Tacky pressure-sensitive adhesive (PSA) are known in the art for use in reclosable structures. In WO 0245949 it is disclosed the generic principle of heat sealability and reclosability in multilayer structures a specifically described an easy-to-open and reclosable heat sealing material comprising an adhesive reclosable layer. Specifically an adhesive reclosable layer is disclosed made of an hot melt adhesive composition comprising a styrenic resin (at least 30 wt % SIS or SBS resin) at least 50% of a tackifier, at least 6% of a reinforcing filler component ad at most 7% wt of a plasticizer.

U.S. 2007/0082161 disclose a packaging article comprising a peelable resealable multilayer film comprising at least three polymer layers. The films comprise a peelable resealable interface adapted to reseal after separation. The force to "reseal" the interface is proportional to the manual pressure exerted on the film. The peelable resealable multilayer films disclosed in U.S. 2007/0082161 comprise at least a first polymer layer of a material selected from the group consisting of polyolefin, ionomer or blends thereof, a second polymer layer of tacky pressure-sensitive adhesive, and a third polymer layer having a glass transition temperature of at least 5° C. such that the bond formed between the second and third layers includes a peelable resealable interface. The second polymer layer in U.S. 2007/0082161 is a pressure-sensitive adhesive comprising a tackifier first component and an elastomer second component of styrene/rubber copolymer, the third polymer layer preferably includes a material selected from the group consisting of ethylene/vinyl alcohol copolymer, polyester, polyketone, polystyrene, acrylic ester-based polymer, cyclic olefin copolymers, methylpentene homopolymer or copolymer, polyamide, and blends thereof. In U.S. 2007/0082161 it is not found PB-1 copolymer as component of the tacky pressure-sensitive adhesive in the second (internal) polymer layer.

As used herein, the term "tackifier" is generally an adhesive additive which serves to modify the rheological properties of the final adhesive. Specifically, a tackifier resin is used to improve the tack of the adhesive composition. As used herein, the term "tack" refers to the "stickiness" of the adhesive or its resistance to removal or deformation from a substrate. The tackifier may comprise any suitable material, preferably, a resin or hydrocarbon resin material or mixtures thereof. Exemplary tackifiers are ESCOREZ® 5400 series, ESCOREZ®1102, ESCOREZ® 1304, ESCOREZ® 1315, ESCOREZ® 1310, ESCOREZ® 2510, ESCOREZ® 2520, available from ExxonMobil Chemical Company, Houston, Tex., U.S.A.; WINGTAK® resins available from Sartomer Company, Inc., Exton, Pa., U.S.A.; PICCOTAC® 1020, 1095, 1098, 1100, 1115, REGALREZ® 1018, 1085, 1094, 1126, 1128, 1139, 6108, 3102, EASTOTAC® H-100E, H-100R, H-100L, H-100W, H-115E, H-115R, H115L, H-115W, REGALITE® C6100, C6100L, C8010, R1010, R1090, R1100 CG, R1100, R1125, R7100, R9100 and POLY-PALE ESTER 10 available from Eastman Chemicals, Kingsport, Tenn., U.S.A; ARKON P90, P100, P115 available from Arakawa Europe, Schwalbach/Ts, GERMANY and SYLVAGUM TR 90, SYLVARES TP 105 available from Arizona Chemical, AB ALMERE, The Netherlands. Particularly preferred are the resins sold under the trade names ARKON P100 and ARKON P115. In the present invention preferred tackifiers, among the hydrogenated hydrocarbon resins, are those having melting temperature equal to or higher than 100° C., more preferably higher than 110° C. providing improved reclosability. As used herein "reclosability" refers to the number of effective reclosures and level of re-open peel strength (force) measured after reclosure on a multilayer easypeel reclosable structure according to the invention. Preferably more than one reclosure should be possible, more preferably at least 5 reclosure cycles; and preferably the re-open peel force is higher than 0.1 N, preferably higher than 0.5 N.

As used herein, the phrase "peel strength" refers to the force required to separate at least a portion of the interface between two adjoining interior film layers when a film has been sealed to a second thermoplastic film. One method for determining such bond strength is described and used in the experimental part.

It has now surprisingly been found that it is possible to obtain a pressure sensitive adhesive (PSA), essentially consisting of a polyolefin composition, particularly suitable for use in easy peel reclosable structures comprising a specific butene-1 (co)polymer as major component providing optimal balance of heat seal strength and reclosability and suitability for use in food contact applications. Optionally and preferably the pressure sensitive adhesive of the invention further comprises at least one tackifier. The said tackifier being capable of further improving the reclosability of a pressure sensitive adhesive layer according to the invention. The tackifier when present can be used in reduced amount with respect to the known pressure sensitive adhesive compositions typically based on styrenic resins.

The PSA compositions according to the invention, provide an alternative to the styrenic rubbers known in the art as polymeric component to be used in pressure sensitive adhesives for tacky reclosable layers in easy peel reclosable structures. Heat seal reclosable multilayer films according to the present invention can be formed by coextrusion of at least three separate polymer layers using either cast or blown film coextrusion methods.

Small amounts of additives, such as slip or anti-block agents, pigments and other processing aids, can be included in any of the layers in the peelable resealable multilayer films according to the invention or in any layers further added to the structure which may be formed into a flexible film e.g metallized or other laminated film structures.

It is thus a first object of the present invention a pressure-sensitive adhesive, substantially consisting of a polyolefin composition, comprising
A) a butene-1 (co)polymer having:
a content of butene-1 derived units of 80 wt % or more, preferably of 84 wt % or more
a flexural modulus (MEF) of 80 MPa or less, preferably, 60 MPa or less, more preferably of 40 MPa or less, even more preferably 30 MPa or less
a melting temperature DSC (TmI) lower than 110° C., preferably equal to or lower than 50° C.; and optionally
B) a tackifier, preferably the tackifier is a "Hydrogenated Hydrocarbon Resin".

Preferably the pressure-sensitive adhesive polyolefin composition comprises:
60-95 wt %, more preferably 70-95 wt %, even more preferably 70-80 wt % of the said butene-1 (co)polymer (A)
5-40 wt %, more preferably 5-30%, even more preferably 20-30 wt % of a tackifier (B) Component (A) and (B) can be for example melt blended directly in a co-extrusion process or blended and pelletized to be subsequently used in a co-extrusion process.

The butene-1 (co)polymer (A) used as the major component for the preparation of pressure sensitive adhesive (PSA) compositions according to the present invention, is typically exhibiting from elastomeric to plastomeric behaviour and can be a homopolymer or a copolymer of butene-1 with one or more α-olefins (different from butene-1). Preferred as α-olefins, which may be present as comonomers in the butene-1 (co)polymer, are those of formula $H_2CH=CHR$, where R is H or methyl or a $C_{3-6}$ linear or branched alkyl, in particular ethylene, propylene, pentene-1, hexene-1,4-methylpentene and octene-1. Particularly preferred as comonomer is ethylene. Preferably, the butene-1 (co)polymer (A) suitable for the use according to the invention has a low crystallinity of less than 40% measured via X-ray, preferably less than 30% even more preferably lower than 20%

Preferably, the butene-1 (co)polymer has a density of 0.899 $g/cm^3$ or less, more preferably of 0.895 $g/cm^3$ or less, even more preferably lower than 0.875.

Preferably, the butene-1 (co)polymer has hardness shore A lower than 90, more preferably lower than 70.

Preferably, the butene-1 (co)polymer has content of xylene insoluble fraction at 0° C. from 1 to 60 wt %, preferably from 1 to 20 wt %, more preferably less than 15 wt %;

Preferably, the butene-1 (co)polymer has intrinsic viscosity [η] measured in tetraline at 135° C. from 1 to 4 dL/g, preferably from 1.5 to 2.5 dL/g; and Preferably, the butene-1 (co)polymer has a distribution of molecular weights (Mw/Mn) measured by GPC lower than 4

Preferably, the butene-1 (co)polymer as no melting temperature (TmII) DSC, measured after cancelling the thermal history of the sample, according to the DSC method described herein below in the experimental part.

The butene-1 (co)polymer (A) is preferably selected from the group consisting of:
(A1) a butene-1 homopolymer or copolymer having:
percentage of isotactic pentads (mmmm %) from 10% to 50%, preferably from 10% to 40%, and
more preferably at least one of the following properties
distribution of molecular weights (Mw/Mn) measured by GPC higher than 3, preferably of from 3 to 4; and
absence of 4,1 inserted butene units;
(A2) a butene-1 homo or copolymer, preferably a butene-1/ethylene copolymer or a butene-1/ethylene/propylene terpolymer having the following properties:
distribution of molecular weights (Mw/Mn) measured by GPC equal to or lower than 3, preferably from 2 to 3; and
more preferably
percentage of isotactic pentads (mmmm%) higher than 80%, preferably equal to or higher than 85%, even more preferably higher than 90% , The butene-1 (co)polymer (A1) is preferably an homopolymer or a copolymer having a content of comonomer derived units from 1 to 15% by mol. The preferred alfa olefin comonomers are ethylene and propylene. The butene-1 (co)polymer (A1) can be obtained contacting 1-butene and optionally one or more alpha olefins, under polymerization conditions, in the presence of a Ziegler Natta catalyst system comprising:
(a) a solid component comprising a Ti compound and an internal electron-donor compound supported on MgCl2;
(b) an alkylaluminum cocatalyst; and
(c) a compound of formula (I) as external donor

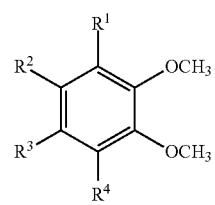

(I)

wherein:
R1, R2, R3 and R4, equal to or different from each other, are hydrogen atoms or C1-C20 hydrocarbon radicals optionally containing heteroatoms belonging to groups 13-17 of the Periodic Table of the Elements; or two R1, R2, R3 and R4 can be joined to form a C5-C20, saturated or unsaturated ring, said ring can be substituted by C1-C10 hydrocarbon radicals optionally containing heteroatoms belonging to groups 13-17 of the Periodic Table of the Elements. The decrease in the stereoregulating capability of the catalyst is deemed linked to the external electron donor compound. The external electron donor compound (c) is fed in such an amount to give a molar ratio between the organoaluminum compound and said electron donor compound (A1/c) higher than 2 preferably it is comprised between 4 and 1000, more preferably between 10 an 200, even more preferably between 20 and 150.

Magnesium dichloride in active form is preferably used as a support. It is widely known from the patent literature that magnesium dichloride in active form is particularly suited as a support for Ziegler-Natta catalysts. In particular, U.S. Pat. No. 4,298,718 and U.S. Pat. No. 4,495,338 were the first to describe the use of these compounds in Ziegler-Natta catalysis. The preferred titanium compounds used in the catalyst component are $TiCl_4$ and $TiCl_3$; furthermore, also Ti-haloalcoholates of formula $Ti(OR)_{n-y}X_y$, where n is the valence of titanium, X is halogen, preferably chlorine, y is a number between 1 and n and R is a hydrocarbon radical having 1-18 carbon atoms, can be used.

The internal electron-donor compound is preferably selected from esters and more preferably from alkyl, cycloalkyl or aryl esters of monocarboxylic acids, for example benzoic acids, or polycarboxylic acids, for example phthalic or succinic acids, the said alkyl, cycloalkyl or aryl groups having from 1 to 18 carbon atoms. Preferred internal donors are $C_1$-$C_{20}$ alkyl esters of phthalic acids, possibly substituted. Particularly preferred are the $C_1$-$C_6$ linear or branched alkyl esters. Specific examples are, diethyl phthalate, di-n-propyl phthalate, di-n-butyl phthalate, di-n-pentyl phthalate, di-i-pentyl phthalate, bis(2-ethylhexyl) phthalate, ethyl-isobutyl phthalate, ethyl-n-butyl phthalate, di-n-hexyl phthalate, di-isobutylphthalate Generally, the internal electron donor compound is used in molar ratio with respect to the $MgCl_2$ of from 0.01 to 1 preferably from 0.05 to 0.5.

The preparation of the solid catalyst component can be carried out according to several methods. The preparation of catalyst components in spherical form is described for example in European Patent Applications EP-A-395083, EP-A-553805, EP-A-553806, EPA-601525 and WO98/44001. The alkyl-Al compound (b) is preferably chosen among the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$. The external donors (c) are preferably selected from the compounds of formulas (Ia)

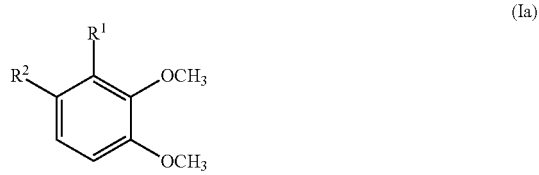

wherein R1 and R2, are hydrogen atoms or linear or branched C1-C20-alkyl radicals. Particularly preferred are 2,3-dimethoxy-toluene, 3,4-dimethoxy-toluene. Examples of the said catalyst system and of polymerization processes employing such catalyst system can be found in the international patent application PCT/EP2010/054356.

The butene-1 (co)polymer (A2) can have a measurable melting enthalpy after aging. Particularly, measured after 10 days of aging at room temperature, the melting enthalpy of (A2) can be of less than 25 J/g, preferably of from 4 to 20 J/g. Preferably the butene-1 (co) polymer (A2) is a butene-1/ethylene copolymer having a content of ethylene derived units lower than 18% by mol, even more preferably of from 13 to 18% by mol, corresponding to from about 7 to 10 wt % with respect to the butene-1 (co) polymer weight.

The butene-1 (co)polymer (A2) can be obtained by polymerizing the monomer(s) in the presence of a metallocene catalyst system obtainable by contacting:
a stereorigid metallocene compound;
an alumoxane or a compound capable of forming an alkyl metallocene cation; and, optionally,
an organo aluminum compound.

Examples of the said catalyst system and of polymerization processes employing such catalyst system can be found in WO2004/099269 and WO2009/000637.

In general, the polymerization process for the preparation of the butene-1 (co)polymer (C) can be carried out according to known techniques, for example slurry polymerization using as diluent a liquid inert hydrocarbon, or solution polymerization using for example the liquid butene-1 as a reaction medium. Moreover, it may also be possible to carry out the polymerization process in the gas-phase, operating in one or more fluidized or mechanically agitated bed reactors. The polymerization carried out in the liquid butene-1 as a reaction medium is preferred.

As a general rule, the polymerization temperature is generally comprised between −100° C. and +200° C., preferably from 20 to 120° C., more preferably from 40 to 90° C., most preferably from 50° C. to 80° C.

The polymerization pressure is generally comprised between 0.5 and 100 bar.

The polymerization can be carried out in one or more reactors that can work under same or different reaction conditions such as concentration of molecular weight regulator, comonomer concentration, external electron donor concentration, temperature, pressure etc.

The butene-1 (co)polymer plastomer (A) is present preferably as a majority component (more than 50 wt %, preferably more than 70 wt %) of the PSA composition according to the present invention. The butene-1 (co)polymer plastomer (A) can be further advantageously a composition consisting of:
i) 80 wt % or more, preferably from 85 to 95 wt %, more preferably, 93-90% of a butene-1 polymer having the above said properties of (A1 or A2), and
ii) up to 20 wt %, preferably from 5 to 15 wt %, more preferably from 7 to 10 wt % of a crystalline propylene polymer;
provided that the total content of ethylene and/or propylene derived units in the composition (i)+(ii) are present in amounts equal to or less than 16 wt %.

The crystalline propylene polymer (ii) is preferably a low SIT propylene copolymer preferably a propylene terpolymer, even more preferably a copolymer of propylene with ethylene and a C4-C8 alpha-olefin or blends thereof. The overall handability of the plastomer (A), particularly preferably when it is a plastomer from metallocene catalysis, can be advantageously improved by in line compounding up to 20 wt % of the said crystalline propylene polymer component (ii), without substantial deterioration of other mechanical properties. The crystalline propylene polymer (ii) has tipically a value of melt flow rate (MFR) at 230° C., 2.16 kg of from 0.6 to 10 g/10 min, preferably of from 2 to 10 g/10 min, melting temperature DSC of from 130° C. to 160° C.

The total content of ethylene in the low sit crystalline propylene polymer composition (ii) being 1% to 5% by weight and the total content of C4-C8 alpha -olefin in the composition (ii) being 2.4% to 12% by weight.

As a customary routine, the relevant experts can add further components additives to the 1-butene (co) polymer (A) (such as stabilizers, antioxidants, anticorrosives, nucleating agents, processing aids, etc.) and both organic and inorganic fillers which can impart specific properties, without departing from the gist of the invention.

The tackifier resin (B) is preferably chosen among aromatic petroleum hydrogenated hydrocarbon resins, (CAS Reg. No. 88526-47-0), produced by the catalytic polymerization of aromatic substituted olefins from low boiling distillates of cracked petroleum stocks with a boiling point no greater than 220° C. (428° F.), and the subsequent catalytic reduction of the resulting aromatic petroleum hydrocarbon resin. The resulting preferred resin suitable for to be used as a component in blends with other polymers according to the present invention are those having of from 100-120° C. of melting temperature (Tm). Preferred are those tackifiers suitable to be also used in the manufacture of food-contact materials. In the examples "Hydrogenated Hydrocarbon Resin" sold under the trade name Arkon P100 (Tm 100° C.) and Arkon P115 (Tm 115° C.) by Arakawa Chemical Industries Ltd have been used.

A further object of the present invention is a multilayer easy peel reclosable film structure for heat seal application wherein at least an inner layer is made of, or substantially consisting of, the pressure sensitive adhesive according to the present invention.

Preferred multilayer easy peel reclosable film structures for heat seal against a support according to the invention are multilayer co-extruded film comprising at least:
- a sealing outer layer (preferred thickness from 3-10 micron e.g 5 micron).
- a pressure-sensitive adhesive inner layer (preferred thickness from 10 to 30 micron preferably from 15-25, e.g. 20 micron): comprising or substantially consisting of the pressure sensitive adhesive according to the invention.
- an external support layer, in contact on the other side with the said inner layer, (preferred thickness of from 10 to 50, e.g. abt. 30 micron).

Particularly preferred multilayer easy peel reclosable film structures for heat seal against a polyethylene support according to the invention are multilayer co-extruded blown film comprising at least:
- a sealing outer layer (preferred thickness from 3-10 micron e.g 5 micron) made of polyethylene homo or copolymers of polyethylene with other C3-C10 alfa-olefins having MIE @190° C./2.16 Kg of from 0.1 to 8 g/10 min, density from 0.916 to 0.935 g/cm³, preferably LLdPE or LDPE or MDPE.
- a Pressure-sensitive adhesive inner layer (preferred thickness from 10 to 30 micron preferably from 15-25, e.g. 20 micron): comprising or substantially consisting of the pressure sensitive adhesive according to the invention.
- an external support layer, in contact on the other side with the said inner layer, (preferred thickness of from 10 to 50, e.g. abt. 30 micron) made of propylene homopolymers or copolymers of propylene with ethylene or other C4-C10 alfa-olefins having MIL @230° C./2.16Kg of from 0.5 to 15 g/10 min, density from 0.880 to 0.910 g/cm³.

The relevant experts would know how to adapt the nature of the sealing outer layer and external support layer for heat seal against different materials e.g. polypropylene, styrenic resins, PVC, PET rigid support or films or sheets. Particularly the outer (external) support layer can be also of different materials (e.g. LLDPE, mLLDPE or other random copo or interpolymers such as Affinity type) and comprise multiple layers in the composite laminated structure (including, paper, aluminum foils and /or metallization or ink-print layers.

The particulars are given in the following examples, which are given to illustrate, without limiting, the present invention.

The following standard procedures were used for testing the properties defined in the examples and in the general description.
MFR: ISO 1133 with a load of 2.16 kg at 190° C. (except where different temperature and load are specified);
Intrinsic viscosity: determined in tetrahydronaphthalene at 135° C. (ASTM D 2857);
Density: ISO 1183;
Flexural elastic modulus: ISO 178
Hardness (Shore A): ISO 868;
Tg determination via DMTA analysis Molded specimen of 76 mm by 13 mm by 1 mm are fixed to the DMTA machine for tensile stress. The frequency of the tension and relies of the sample is fixed at 1 Hz. The DMTA translate the elastic response of the specimen starting form −100° C. to 130° C. In this way it is possible to plot the elastic response versus temperature. The elastic modulus for a viscoelastic material is defined as E=E'+iE". The DMTA can split the two components E' and E" by their resonance and plot E' vs temperature and E'/E"=tan (δ) vs temperature.

The glass transition temperature Tg is assumed to be the temperature at the maximum of the curve E'/E"=tan (δ) vs temperature.

Comonomer contents: determined by IR spectroscopy or by NMR (when specified). Particularly for the butene-1 (co)polymers the amount of comonomers was calculated from $^{13}$C-NMR spectra of the copolymers of the examples. Measurements were performed on a polymer solution (8-12 wt %) in dideuterated 1,1,2,2-tetrachloroethane at 120° C. The $^{13}$C NMR spectra were acquired on a Bruker AV-600 spectrometer operating at 150.91 MHz in the Fourier transform mode at 120° C. using a 90° pulse, 15 seconds of delay between pulses and CPD (WALTZ16) to remove $^{1}$H-$^{13}$C coupling. About 1500 transients were stored in 32K data points using a spectral window of 60 ppm (0-60 ppm).

Copolymer Composition

Diad distribution is calculated from $^{13}$C NMR spectra using the following relations:

$$PP=100I_1/\Sigma$$

$$PB=100I_2/\Sigma$$

$$BB=100(I_3-I_{19})/\Sigma$$

$$PE=100(I_5+I_6)/\Sigma$$

$$BE=100(I_9+I_{10})/\Sigma$$

$$EE=100(0.5(I_{15}+I_6+I_{10})+0.25(I_{14}))/\Sigma$$

Where $\Sigma=I_1+I_2+I_3-I_{19}+I_5+I_6+I_9+I_{10}+0.5(I_{15}+I_6+I_{10})+0.25(I_{14})$ The molar content is obtained from diads using the following relations:

$$P(m\%)=PP+0.5(PE+PB)$$

$$B(m\%)=BB+0.5(BE+PB)$$

$$E(m\%)=EE+0.5(PE+BE)$$

$I_i$, $I_2$, $I_3$, $I_5$, $I_6$, $I_9$, $I_6$, $I_{10}$, $I_{14}$, $I_{15}$, $I_{19}$ are integrals of the peaks in the $^{13}$C NMR spectrum (peak of EEE sequence at 29.9 ppm as reference). The assignments of these peaks are made according to J. C. Randal, *Macromol. Chem Phys., C29*, 201 (1989), M. Kakugo, Y. Naito, K. Mizunuma and T. Miyatake, *Macromolecules*, 15, 1150, (1982), and H. N. Cheng, *Journal of Polymer Science, Polymer Physics Edition*, 21, 57 (1983). They are collected in Table A (nomenclature according to C. J. Carman, R. A. Harrington and C. E. Wilkes, *Macromolecules*, 10, 536 (1977)).

TABLE A

| I | Chemical Shift (ppm) | Carbon | Sequence |
|---|---|---|---|
| 1 | 47.34–45.60 | $S_{\alpha\alpha}$ | PP |
| 2 | 44.07–42.15 | $S_{\alpha\alpha}$ | PB |
| 3 | 40.10–39.12 | $S_{\alpha\alpha}$ | BB |
| 4 | 39.59 | $T_{\delta\delta}$ | EBE |
| 5 | 38.66–37.66 | $S_{\alpha\gamma}$ | PEP |
| 6 | 37.66–37.32 | $S_{\alpha\delta}$ | PEE |
| 7 | 37.24 | $T_{\beta\delta}$ | BBE |
| 8 | 35.22–34.85 | $T_{\beta\beta}$ | XBX |
| 9 | 34.85–34.49 | $S_{\alpha\gamma}$ | BBE |
| 10 | 34.49–34.00 | $S_{\alpha\delta}$ | BEE |
| 11 | 33.17 | $T_{\delta\delta}$ | EPE |
| 12 | 30.91–30.82 | $T_{\beta\delta}$ | XPE |
| 13 | 30.78–30.62 | $S_{\gamma\gamma}$ | XEEX |
| 14 | 30.52–30.14 | $S_{\gamma\delta}$ | XEEE |
| 15 | 29.87 | $S_{\delta\delta}$ | EEE |
| 16 | 28.76 | $T_{\beta\beta}$ | XPX |
| 17 | 28.28–27.54 | $2B_2$ | XBX |
| 18 | 27.54–26.81 | $S_{\beta\delta} + 2B_2$ | BE, PE, BBE |
| 19 | 26.67 | $2B_2$ | EBE |
| 20 | 24.64–24.14 | $S_{\beta\beta}$ | XEX |
| 21 | 21.80–19.50 | $CH_3$ | P |
| 22 | 11.01–10.79 | $CH_3$ | B |

Fractions soluble and insoluble in xylene at 25° C. (XS 25° C.): 2.5 g of polymer are dissolved in 250 mL of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus, one calculates the percent by weight of polymer soluble (Xylene Solubles—XS) and insoluble at room temperature (25° C.).

The percent by weight of polymer insoluble in xylene at ambient temperature (25° C.) is considered the isotactic index of the polymer. This value corresponds substantially to the isotactic index determined by extraction with boiling n-heptane, which by definition constitutes the isotactic index of polypropylene.

Fractions soluble and insoluble in xylene at 0° C. (XS 0° C.): 2.5 g of the butene-1 (co)polymers (component (C)) are dissolved in 250 ml of xylene at 135° C. under agitation. After 30 minutes the solution is allowed to cool to 100° C., still under agitation, and then placed in a water and ice bath to cool down to 0° C. Then, the solution is allowed to settle for 1 hour in the water and ice bath. The precipitate is filtered with filter paper. During the filtering, the flask is left in the water and ice bath so as to keep the flask inner temperature as near to 0° C. as possible. Once the filtering is finished, the filtrate temperature is balanced at 25° C., dipping the volumetric flask in a water-flowing bath for about 30 minutes and then, divided in two 50 ml aliquots. The solution aliquots are evaporated in nitrogen flow, and the residue dried under vacuum at 80° C. until constant weight is reached. The weight difference in between the two residues must be lower than 3%; otherwise the test has to be repeated. Thus, one calculates the percent by weight of polymer soluble (Xylene Solubles at 0° C.=XS 0° C.) from the average weight of the residues. The insoluble fraction in o-xylene at 0° C. (xylene Insolubles at 0° C.=XI % 0° C.) is: XI % 0° C=100−XS % 0° C.

Determination of X-ray Crystallinity

The X-ray crystallinity was measured with an X-ray Diffraction Powder Diffractometer using the Cu-K$\alpha$1 radiation with fixed slits and collecting spectra between diffraction angle 2$\Theta$=5° and 2$\Theta$=35° with step of 0.1° every 6 seconds.

Measurements were performed on compression molded specimens in the form of disks of about 1.5-2.5 mm of thickness and 2.5-4.0 cm of diameter. These specimens are obtained in a compression molding press at a temperature of 200° C.±5° C. without any appreciable applied pressure for 10 minutes. Then applying a pressure of about 10 Kg/cm$^2$ for about few second and repeating this last operation for 3 times.

The diffraction pattern was used to derive all the components necessary for the degree of cristallinity by defining a suitable linear baseline for the whole spectrum and calculating the total area (Ta), expressed in counts/sec·2$\Theta$, between the spectrum profile and the baseline. Then a suitable amorphous profile was defined, along the whole spectrum, that separate, according to the two phase model, the amorphous regions from the crystalline ones. Thus it is possible to calculate the amorphous area (Aa), expressed in counts/sec·2$\Theta$, as the area between the amorphous profile and the baseline; and the cristalline area (Ca), expressed in counts/sec·2$\Theta$, as Ca=Ta−Aa The degree of cristallinity of the sample was then calculated according to the formula:

$$\% Cr = 100 \times Ca/Ta$$

The thermal properties (melting temperatures and enthalpies) were determined by Differential Scanning Calorimetry (D.S.C.) on a Perkin Elmer DSC-7 instrument. The melting temperatures of butene-1 homo and copolymers were determined according to the following method:

TmII (measured in second heating run): a weighted sample (5-10 mg) obtained from the polymerization was sealed into aluminum pans and heated at 200° C. with a scanning speed corresponding to 20° C./minute. The sample was kept at 200° C. for 5 minutes to allow a complete melting of all the crystallites thus cancelling the thermal history of the sample. Successively, after cooling to −20° C. with a scanning speed corresponding to 10° C./minute, the peak temperature was taken as crystallization temperature (Tc). After standing 5 minutes at −20° C., the sample was heated for the second time at 200° C. with a scanning speed corresponding to 10° C./min. In this second heating run, the peak temperature when present was taken as the melting temperature of the polybutene-1 (PB) crystalline form II (TmII) and the area as global melting enthalpy ($\Delta$HfII).

The melting enthalpy after 10 days and the melting temperature of crystalline form I (TmI) was measured as follows by using the Differential Scanning Calorimetry (D.S.C.) on an Perkin Elmer DSC-7 instrument: A weighted sample (5-10 mg) obtained from the polymerization was sealed into aluminum pans and heated at 200° C. with a scanning speed corresponding to 20° C./minute. The sample was kept at 200° C. for 5 minutes to allow a complete melting of all the crystallites. The sample was then stored for 10 days at room temperature. After 10 days the sample was subjected to DSC, it was cooled to −20° C., and then it was heated at 200° C. with a scanning speed corresponding to 10° C./min. In this heating run, the first peak temperature coming from the lower temperature side in the thermogram was taken as the melting temperature (TmI), and the area as global melting enthalpy after 10 days (ΔHf).

When present a propylene crystallinity coming from addition of a polypropylene polymer (ii) a further melting temperature peak (PP) can be detected at higher temperatures.

Determination of isotactic pentads content: 50 mg of each sample were dissolved in 0.5 mL of $C_2D_2Cl_4$.

The $^{13}C$ NMR spectra were acquired on a Bruker DPX-400 (100.61 Mhz,90° pulse, 12 s delay between pulses). About 3000 transients were stored for each spectrum; mmmm pentad peak (27.73 ppm) was used as reference.

The microstructure analysis was carried out as described in literature (Macromolecules 1991, 24, 2334-2340, by Asakura T. et Al. and Polymer, 1994, 35, 339, by Chujo R. et Al.).

The percentage value of pentad tacticity (mmmm %), provided in the experimental part for butene-1 homo and copolymers, is the percentage of stereoregular pentads (isotactic pentad) as calculated from the relevant pentad signals (peak areas) in the NMR region of branched methylene carbons (around 27.73 ppm assigned to the BBBBB isotactic sequence), with due consideration of the superposition between stereoirregular pentads and of those signals, falling in the same region, due to the alfa-olefin comonomer (e.g propylene or ethylene derived units when present).

MWD Determination by Gel Permeation Chromatography (GPC)

Molecular weight parameters and molecular weight distributions for all the samples were measured using a Waters GPCV 2000 apparatus, which was equipped with a column set of four PLgel Olexis mixed-gel (Polymer Laboratories) and an IR4 infrared detector (PolymerChar). The dimensions of the columns were 300×7.5 mm and their particle size 13 μm. The mobile phase used was 1-2-4-trichlorobenzene (TCB) and its flow rate was kept at 1.0 mL/min. All the measurements were carried out at 150° C. Solution concentrations were 0.1 g/dL in TCB and 0.1 g/L of 2,6-diterbuthyl-p-chresole were added to prevent degradation. For GPC calculation, a universal calibration curve was obtained using 10 polystyrene (PS) standard samples supplied by Polymer Laboratories (peak molecular weights ranging from 580 to 8500000). A third order polynomial fit was used for interpolate the experimental data and obtain the relevant calibration curve. Data acquisition and processing was done using Empower (Waters). The Mark-Houwink relationship was used to determine the molecular weight distribution and the relevant average molecular weights: the K values were $K_{PS}=1.21\times10^{-4}$ dL/g and $K_{PB}=1.78\times10^{-4}$ dL/g for PS and PB respectively, while the Mark-Houwink exponents α=0.706 for PS and α=0.725 for PB were used.

For butene/ethylene copolymers, as far as the data evaluation is concerned, it was assumed for each sample that the composition was constant in the whole range of molecular weight and the K value of the Mark-Houwink relationship was calculated using a linear combination as reported below:

$$K_{EB}=x_E K_{PE}+x_P K_{PB}$$

where $K_{EB}$ is the constant of the copolymer, $K_{PE}$ ($4.06\times10^{-4}$, dL/g) and $K_{PB}$ ($1.78\times10^{-4}$ dL/g) are the constants of polyethylene and polybutene, $x_E$ and $x_B$ are the ethylene and the butene wt % content. The Mark-Houwink exponents α=0.725 was used for all the butene/ethylene copolymers independently on their composition.

For Butene/propylene copolymers, as PP and PB have very similar K, no corrections were applied and the copolymer was integrated using the K and α values of PB.

MATERIALS USED IN THE EXAMPLES

Table 1 is reporting the structures and properties of butene-1 (co)polymers according to the invention (A1 type and A2 type) and comparatives

|  |  | PB1 | PB2 | PB3 | PB4 | PB5 |
|---|---|---|---|---|---|---|
| Plastomer type |  | A1 | A2 | A2 | A2 | Comparative |
|  |  | C4 homo | C4C2 | C4C2C3** | C4C2 | C4C3 |
| C3 content (NMR) | wt % | — | — | 6.3 | — | 3.9 |
| C2 content (NMR) | wt % | — | 8.3 | 8.6 | 4.8 (IR 5.4) | — |
| Intrinsic Viscosity | dl/g | 2.12 | 2.05 | 1.9 | 1.95 | 2.3 |
| Melt Flow Rate - @ 190/2.16 | g/10 min | 0.4 | 1.1 | 1.0 | 1 | 0.45 |
| Density | g/cc | 0.8694 | 0.874 | 0.8673 | 0.8830 | 0.8786 |
| Flexural elastic modulus (ISO 178) | MPa | <10 | <10 | <10 | 75 | 31 |
| Hardness Shore A (ISO 868) |  | 34.8 | 65 | 61.8 | 89.4 | 74.5 |
| Tg (DMTA) | ° C. | −4.2 | −26.3 | −27 | −22 | −5.8 |
| % cristall. RX | % | 13 | 9 | 9 | 25 | 29 |
| DSC Tm II* | ° C. | nd | Nd | nd(PB) 158(PP) | nd | 100 |
| DSC Tm I |  | 106.3 | 40 | 40.33 | 37.9-48.8 | 118 |
| S.X. 0/0° C. Soluble Total | wt % | 86.9 | 99 | 94.6 | 99 | 57 |
| mmmm % | % | 29 | 91 | 90 | 90 | 54 |
| Mw/Mn |  |  | 3.5 | 2.3 | 2.9 | 2.8 | 6.1 |

-continued

|  |  | PB1 | PB2 | PB3 | PB4 | PB5 |
|---|---|---|---|---|---|---|
| ΔHf after 10 days | J/g | 6.3 | 6.7 | 11.5 | 26.97 | — |
| 1, 4 insertions |  | absent | Na | na | na | absent |

Nd = not detectable
Na = not available
*from DSC thermogram collected in second heating run (after cancelling the thermal history of the sample)
**content of propylene derived units (C3) comes from in-line compounding with 7 wt % of a low sit crystalline propylene terpolymer component (ii) having MIL 5.50 g/10 min @ 230° C./2.16 kg ethylene derived units content abt. 3 wt %, butene-1 derived units abt. 9 wt %

PB1 is a butene-1 homopolymer (type A1) obtained by polymerization of the monomers in the presence of a low stereospecificity Ziegler-Natta catalyst and process as described in the international application WO2006/042815. The external donor used to decrease further the stereoregulating capability of the catalyst to obtain a polymer of the A1 type of the present invention was the external donor 3,4-dimethoxy-toluene. PB1 polymerization was carried out in a liquid-phase stirred reactor in which liquid butene-1 constituted the liquid medium.

The Solid Catalyst Component had been prepared in advance into a 500 ml four-necked round flask, purged with nitrogen, 225 ml of TiCl4 were introduced at 0° C. While stirring, 6.8 g of microspheroidal MgCl2·2.7C2H5OH (prepared as described in Ex. 2 of U.S. Pat. No. 4,399,054 but operating at 3,000 rpm instead of 10,000 rpm) were added. The flask was heated to 40° C. and 4.4 mmoles of diisobutylphthalate were thereupon added. The temperature was raised to 100° C. and maintained for two hours, then the stirring was discontinued, the solid product was allowed to settle and the supernatant liquid was siphoned off.

200 ml of fresh TiCl4 were added, the mixture was reacted at 120° C. for one hour then the supernatant liquid was siphoned off and the solid obtained was washed six times with anhydrous hexane (6×100 ml) at 60° C. and then dried under vacuum. The catalyst component contained 2.8 wt % of Ti and 12.3 wt % of phthalate.

The solid catalyst component, prepared as reported above, was precontacted with AliBu3 (TIBAL) and the external donor 3,4-dimethoxy-toluene with a tibal/donor ratio of 5.7 and a donor/catalyst ratio of 8.83.

The cathalyst obtained was injected (0.6 g/h) into the reactor serie working under the following conditions:
  Temperature: 76° C.
  Butene feed=90.9 Kg/h
  Hydrogen feed=0.65 g/h
  Residence time 135 min Producing about 20 Kg/h of polymer. The results of the characterization carried out on the final polymer are reported in the Table1 for PB1.

PB2 and PB4 are butene-1/ethylene copolymers (type A2) produced according to the process described in WO2004/099269 and WO2009/000637.

PB3 was obtained from PB2 by in-line compounding a crystalline low sit terpolymer (ii) added in amount of 7 wt % with respect to the weight of the (co)polymer composition (A)=(i)+(ii)=PB2+(ii).

PBS is a comparative butene-1 copolymer with propylene produced with the same Ziegler Natta catalyst used also for PB1; but in absence of external donor according to the process described in the International application WO2006/042815 A1.

PB6 is a comparative butene-1 homopolymer MIE @190/2.16 Kg=0.9 g/10 min, density 0.906 g/cc, melting temperatures DSC TmI 114° C., crystallinity 46%, Flexural Modulus 250 MPa, used as a further comparative butene-1 polymer.

The butene-1 (co)polymers (A) were used as such (examples 4-9 in table 3) or melt blended with the tackifiers in amount as indicated in table 2 examples 1-3. The resultant compositions of examples 1-9 were pelletized and dried with use of commercial additives, antisticking agents to improve flowability and contributing to the handability of the compositions. Finishing treatments lead to a total amount of additives in the final pellets typically Less than 1.0 wt %, preferably less than 0.5 wt % even more preferably less than 0.2 wt % (about 100-1500 ppm per additive or less). Examples of such finishing treatments can be found in the international patent application PCT/EP2010/056159.

Subsequently the compositions according to ex 1-9 were coextruded producing a three layer blown film. The inner layer made of the compositions of ex 1-9 (thickness abt. 20 micron) was cohextruded in contact, at one side, with a sealing outer layer and at the other side in contact with an external support layer. The sealing outer layer_(thickness abt. 5 micron) is made of an LDPE having MIE @190° C./2.16 Kg=1.9 g/10 min, density 0.925 g/cm$^3$. The external support layer (thickness 30 micron) is made of a copolymer of propylene with ethylene, having an ethylene content of about 3 wt % and MIL @230° C./2.16 Kg=2 g/10 min, density 0.900 g/cm$^3$.

Blown films have been prepared by extruding each test composition and the polymers for the external layers in a single screw Dr. Collin extruder equipped with a three layers co-extrusion blown film line at a melt temperature of 210-215° C. The throughput was about (abt.) 20 kg/h. The extruder was equipped with an annular die with a diameter 80 mm and having a die gap 1.2 mm. The films were cooled by mean of a dual flow cooling ring with cooling air at ambient temperature. The bubble was layed-flat and winded at a film drawing speed of 9 m/min. The films were produced with a bubble wall thickness of 55 μm, which is the final specimen thickness obtained.

The three layer coextruded blown films were tested for peel strength against a polyethylene support film, made of a polyethylene having MIE @190° C./2.16 Kg=0.75 g/10 min, density 0.923 g/cm$^3$. Peeling was measured after heat seal (first peel) with a RDM sealing machine at various temperatures and further measured also when re-opened after manual pressure reclosure (corresponding to abt. 2 bar of reclosure pressure).

Peel strength was measured in (N/15 mm) with reference to
  ASTM F2029/ASTM F88. For each test the above prepared three layer film specimens were superimposed in alignment with a polyethylene film, the adjacent layers being the sealing outer layer of the three layer film and the polyethylene support film. The superimposed specimens are sealed in transverse direction, after at least 7 days from extrusion, with a RDM Sealer, model HSE-3 multi seal. Sealing time is 0.5 seconds at a pressure of 4 bars. The sealing temperature is increased for each seal, starting from 100° C. The sealed samples are left to cool and stored 7 days under Standard conditions (23° C. and 50% relative humidity). The sealed samples are cut in 15 mm wide strips, which unsealed ends are attached to an Instron machine, where they are tested at a traction speed of 100 mm/min with an initial distance between the grips of 50 mm. The average force (plateau) measured during the tensile test is defined as the peel strength.

After first peel strength measurement at each temperature the strips are reclosed manually and re-opened with the same procedure measuring the peel force at each re-opening cycle. Results are reported in table 2 and 3.

TABLE 2

| Inner layer composition | Ex. N.. | Clarity % | Haze % | MFR @ 190° C./ 2.16 Kg g/10 min | Temp. ° C. | Avg. peel Force (N) | | | | | |
|---|---|---|---|---|---|---|---|---|---|---|---|
| | | | | | | First peeling | $1^{st}$ re-open | $2^{nd}$ re-open | $3^{rd}$ re-open | $4^{th}$ re-open | $5^{th}$ °re-open |
| 85 wt % PB3 + 15 wt % Arkon P100 | 1 | 94.1 | 7.1 | 1.6 | 100 | 2.1 | 0.0 | 0.0 | 0.0 | 0.0 | 0.0 |
| | | | | | 110 | 4.1 | 0.4 | 0.3 | 0.3 | 0.3 | 0.3 |
| | | | | | 120 | 4.0 | 0.4 | 0.3 | 0.3 | 0.3 | 0.2 |
| | | | | | 130 | 4.9 | 0.4 | 0.3 | 0.3 | 0.3 | 0.3 |
| | | | | | 150 | 4.5 | 0.3 | 0.3 | 0.2 | 0.2 | 0.2 |
| | | | | | 170 | 4.6 | 0.4 | 0.3 | 0.3 | 0.3 | 0.2 |
| | | | | | 190 | 3.9 | 0.3 | 0.2 | 0.2 | 0.2 | 0.2 |
| 75 wt % PB3 + 25 wt % Arkon P100 | 2 | 93.8 | 7.3 | 2.5 | 100 | 2.0 | 0.0 | 0.0 | 0.0 | 0.0 | 0.0 |
| | | | | | 110 | 4.1 | 0.7 | 0.6 | 0.5 | 0.5 | 0.5 |
| | | | | | 120 | 4.1 | 0.6 | 0.5 | 0.5 | 0.5 | 0.5 |
| | | | | | 130 | 4.2 | 0.6 | 0.5 | 0.5 | 0.5 | 0.5 |
| | | | | | 150 | 4.4 | 0.6 | 0.6 | 0.5 | 0.5 | 0.5 |
| | | | | | 170 | 4.1 | 0.6 | 0.5 | 0.5 | 0.4 | 0.4 |
| | | | | | 190 | 4.1 | 0.5 | 0.4 | 0.4 | 0.4 | 0.4 |
| 75 wt % PB3 + 25 wt % Arkon P115 | 3 | 93.6 | 7.6 | 2.5 | 100 | 2.1 | 0.0 | 0.0 | 0.0 | 0.0 | 0.0 |
| | | | | | 110 | 4.6 | 0.8 | 0.8 | 0.7 | 0.6 | 0.6 |
| | | | | | 120 | 4.7 | 0.8 | 0.7 | 0.6 | 0.6 | 0.5 |
| | | | | | 130 | 5.2 | 0.9 | 0.7 | 0.6 | 0.6 | 0.6 |
| | | | | | 150 | 5.2 | 0.8 | 0.7 | 0.6 | 0.6 | 0.6 |
| | | | | | 170 | 4.9 | 0.8 | 0.6 | 0.5 | 0.5 | 0.5 |
| | | | | | 190 | 5.0 | 0.7 | 0.5 | 0.5 | 0.5 | 0.5 |

TABLE 3 butene-1 (co)polymers as such in the inner layer

| Inner layer composition | Ex. N.. | Clarity % | Haze % | MFR @ 190° C./ 2.16 Kg g/10 min | Temp. ° C. | Avg. peel Force (N) | | | | | |
|---|---|---|---|---|---|---|---|---|---|---|---|
| | | | | | | First peeling | $1^{st}$ re-open | $2^{nd}$ re-open | $3^{rd}$ re-open | $4^{th}$ re-open | $5^{th}$ °re-open |
| PB1 | 7 | 93.6 | 7.7 | 0.4 | 100 | 3.2 | 0.2 | 0.2 | 0.2 | 0.1 | 0.1 |
| | | | | | 110 | 2.3 | 0.2 | 0.2 | 0.2 | 0.2 | 0.2 |
| | | | | | 120 | 2.9 | 0.2 | 0.2 | 0.2 | 0.2 | 0.2 |
| | | | | | 130 | 2.3 | 0.2 | 0.2 | 0.2 | 0.2 | 0.2 |
| | | | | | 150 | 2.8 | 0.2 | 0.2 | 0.2 | 0.2 | 0.2 |
| | | | | | 170 | 2.0 | 0.2 | 0.2 | 0.2 | 0.2 | 0.2 |
| PB3 | 4 | 94.5 | 6.5 | 1.0 | 100 | 4.5 | 0.1 | 0.1 | 0.1 | 0.1 | 0.1 |
| | | | | | 110 | 5.2 | 0.3 | 0.2 | 0.2 | 0.2 | 0.1 |
| | | | | | 120 | 5.8 | 0.3 | 0.2 | 0.2 | 0.2 | 0.2 |
| | | | | | 130 | 5.6 | 0.3 | 0.2 | 0.2 | 0.2 | 0.2 |
| | | | | | 150 | 5.8 | 0.3 | 0.2 | 0.2 | 0.2 | 0.2 |
| | | | | | 170 | 5.3 | 0.3 | 0.2 | 0.2 | 0.2 | 0.2 |
| | | | | | 190 | 5.2 | 0.3 | 0.2 | 0.2 | 0.2 | 0.2 |
| PB4 | 8 | 94.7 | 6.5 | 1.0 | 100 | 5.4 | 0.1 | 0.0 | 0.0 | 0.0 | 0.0 |
| | | | | | 110 | 6.3 | 0.2 | 0.1 | 0.1 | 0.0 | 0.0 |
| | | | | | 120 | 6.2 | 0.2 | 0.1 | 0.1 | 0.0 | 0.0 |
| | | | | | 130 | 5.5 | 0.1 | 0.1 | 0.0 | 0.0 | 0.0 |
| | | | | | 150 | 5.8 | 0.1 | 0.1 | 0.0 | 0.0 | 0.0 |
| | | | | | 170 | 5.4 | 0.1 | 0.0 | 0.0 | 0.0 | 0.0 |
| | | | | | 190 | 5.0 | 0.1 | 0.1 | 0.0 | 0.0 | 0.0 |
| PB5 Comparative | 5c | 94.2 | 7.8 | 0.5 | 100 | 0.7 | 0.1 | 0.0 | 0.0 | 0.0 | 0.0 |
| | | | | | 110 | 2.3 | 0.1 | 0.0 | 0.0 | 0.0 | 0.0 |
| | | | | | 120 | 1.1 | 0.1 | 0.0 | 0.0 | 0.0 | 0.0 |
| | | | | | 130 | 1.2 | 0.1 | 0.1 | 0.0 | 0.0 | 0.0 |
| | | | | | 150 | 1.1 | 0.1 | 0.0 | 0.0 | 0.0 | 0.0 |
| | | | | | 170 | 1.0 | 0.1 | 0.0 | 0.0 | 0.0 | 0.0 |
| | | | | | 190 | 1.2 | 0.1 | 0.1 | 0.0 | 0.0 | 0.0 |
| PB6 Comparative | 6c | 94.6 | 9.4 | 0.9 | 100 | 1.1 | 0.0 | 0.0 | 0.0 | 0.0 | 0.0 |
| | | | | | 110 | 1.2 | 0.0 | 0.0 | 0.0 | 0.0 | 0.0 |
| | | | | | 120 | 1.0 | 0.0 | 0.0 | 0.0 | 0.0 | 0.0 |

TABLE 3-continued butene-1 (co)polymers as such in the inner layer

| Inner layer composition | Ex. N.. | Clarity % | Haze % | MFR @ 190° C./ 2.16 Kg g/10 min | Temp. ° C. | Avg. peel Force (N) | | | | | |
|---|---|---|---|---|---|---|---|---|---|---|---|
| | | | | | | First peeling | 1$^{st}$ re-open | 2$^{nd}$ re-open | 3$^{rd}$ re-open | 4$^{th}$ re-open | 5$^{th}$ re-open |
| | | | | | 130 | 0.8 | 0.0 | 0.0 | 0.0 | 0.0 | 0.0 |
| | | | | | 150 | 1.0 | 0.0 | 0.0 | 0.0 | 0.0 | 0.0 |
| | | | | | 170 | 1.0 | 0.0 | 0.0 | 0.0 | 0.0 | 0.0 |
| | | | | | 190 | 1.2 | 0.0 | 0.0 | 0.0 | 0.0 | 0.0 |

The invention claimed is:

1. A pressure-sensitive adhesive comprising:
   (A) a butene-1 copolymer having:
      (i) a content of butene-1 derived units of 80 wt. % or more, based upon the total weight of the butene-1 copolymer,
      (ii) a flexural modulus (MEF) of 80 MPa or less,
      (iii) a melting temperature DSC (TmI) lower than 50° C.; and optionally
   (B) a tackifier.

2. The pressure-sensitive adhesive according to claim 1 comprising:
   (A) 60-95 wt. % of the butane-1 copolymer, based upon the total weight of the pressure-sensitive adhesive; and
   (B) 5-40 wt. % of the tackifier, based upon the total weight of the pressure-sensitive adhesive.

3. The pressure-sensitive adhesive according to claim 1, wherein the copolymer (A) has crystallinity of less than 40% measured via X-ray.

4. The pressure-sensitive adhesive according to claim 1, wherein the butene-1 copolymer has hardness shore A lower than 90.

5. The pressure-sensitive adhesive according to claim 1, wherein the tackifier is a hydrogenated hydrocarbon resin.

6. The pressure-sensitive adhesive according to claim 1, wherein the copolymer (A) is selected from the group consisting of:
   (A1) a butene-1 copolymer comprising from 10 to 50% isotactic pentads, and
   (A2) a butene-1/ethylene copolymer or a butene-1/ethylene/propylene terpolymer having a (Mw/Mn) measured by GPC lower than 3.

7. The pressure-sensitive adhesive according to claim 1, wherein the pressure-sensitive is in contact with
   (i) a sealing outer layer made of a polyethylene homo or copolymer of polyethylene with other C3-C10 alpha-olefins having a melt index from 0.1 to 8 g/10 min measured at 190° C. with a load of 2.16 kg, and having a density from 0.916 to 0.935 g/cm$^3$; and
   (ii) an outer support layer made of a propylene homopolymer or copolymer of propylene with ethylene or with other C4-C 10 alpha-olefins, having a melt index from 0.5 to 15 g/10 min, measured at 230 ° C. with a load of 2.16 kg, and having a density from 0.880 to 0.910 g/cm$^3$.

* * * * *